United States Patent
Scott

(10) Patent No.: US 10,445,237 B1
(45) Date of Patent: Oct. 15, 2019

(54) DATA PROCESSING SYSTEM HAVING A CACHE WITH A STORE BUFFER

(71) Applicant: NXP USA, INC., Austin, TX (US)

(72) Inventor: Jeffrey William Scott, Austin, TX (US)

(73) Assignee: NXP USA, Inc., Austin, TX (US)

( * ) Notice: Subject to any disclaimer, the term of this patent is extended or adjusted under 35 U.S.C. 154(b) by 10 days.

(21) Appl. No.: 15/953,680

(22) Filed: Apr. 16, 2018

(51) Int. Cl.
   *G06F 12/08* (2016.01)
   *G06F 12/0813* (2016.01)
   *G06F 12/0815* (2016.01)

(52) U.S. Cl.
   CPC ...... *G06F 12/0813* (2013.01); *G06F 12/0815* (2013.01)

(58) Field of Classification Search
   CPC . G06F 12/0813; G06F 12/0815; G06F 9/3834
   USPC ........................................................ 711/119
   See application file for complete search history.

(56) References Cited

U.S. PATENT DOCUMENTS

| | | | |
|---|---|---|---|
| 7,373,461 | B2 | 5/2008 | Zeffer et al. |
| 7,480,770 | B2 | 1/2009 | Zeffer et al. |
| 7,502,893 | B2 | 3/2009 | Deshpande |
| 8,751,753 | B1 | 6/2014 | Rozas |
| 2007/0255908 | A1 | 11/2007 | Zeffer et al. |
| 2009/0019232 | A1 | 1/2009 | Deshpande et al. |
| 2017/0091102 | A1 | 3/2017 | Wright |
| 2017/0116126 | A1 | 4/2017 | Rozas |

*Primary Examiner* — Hashem Farrokh

(57) ABSTRACT

In a data processing system, a store request is provided having corresponding store data and a corresponding access address, and a memory coherency required attribute corresponding to the access address of the store request is provided. When the store request results in a write-through store due to a cache hit or results in a cache miss, the corresponding access address and store data is stored in a selected entry of the store buffer and a merge allowed indicator is stored in the selected entry which indicates whether or not the selected entry is a candidate for merging. The merge allowed indicator is determined based on the memory coherency required attribute from the MMU and a store buffer coherency enable control bit of the cache. Entries of the store buffer which include an asserted merge allowed indicator and share a memory line in the memory are merged.

20 Claims, 4 Drawing Sheets

DATA PROCESSING SYSTEM HAVING A CACHE WITH A STORE BUFFER

BACKGROUND

Field

This disclosure relates generally to data processing systems, and more specifically, to data processing systems having a cache with a store buffer.

Related Art

Within data processing systems, caches are commonly used to reduce the average cost (time or energy) to access data from the main memory. A cache is typically a smaller, faster memory, closer to the processor, which stores copies of the data from frequently used main memory locations. An access request from the processor may therefore hit or miss in the cache, in which the greater the hit rate, the more efficient the accessing of data. In the case of a load or read access request from the processor, upon a cache hit, read data is provided from the cache to the processor, and upon a cache miss, the read data is retrieved from main memory. In the case of a store or write access request from the processor, upon a cache hit, the write data is provided by the processor to the cache, and at some point (either simultaneously or at a later point in time), the write data is also written to main memory, and upon a cache miss, the write data also has to be written at some point to main memory. Therefore, a need exists to write this data to main memory in a manner which improves performance and reduces bus traffic.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

In a data processing system having a cache, the cache includes a store buffer to store data which is to be written to memory. The entries of the store buffer may be selectively merged to improve performance and reduce bus traffic. In one embodiment, a merge allowed indicator is set for each store buffer entry, when created, which indicates whether or not the store buffer entry is a candidate for merging. This merge allowed indicator for each store buffer entry is asserted based on a memory coherency required attribute corresponding to the store buffer entry and the value of a store buffer coherency enable control bit. For example, if the store buffer entry corresponds to a memory coherency region, the merge allowed indicator of the store buffer entry will be asserted only if the store buffer coherency enable control bit is asserted. Entries which have their merge allowed indicators asserted and share a same memory line can then be merged into one entry. In this manner, bus traffic can be reduced and performance improved.

Figure 1:
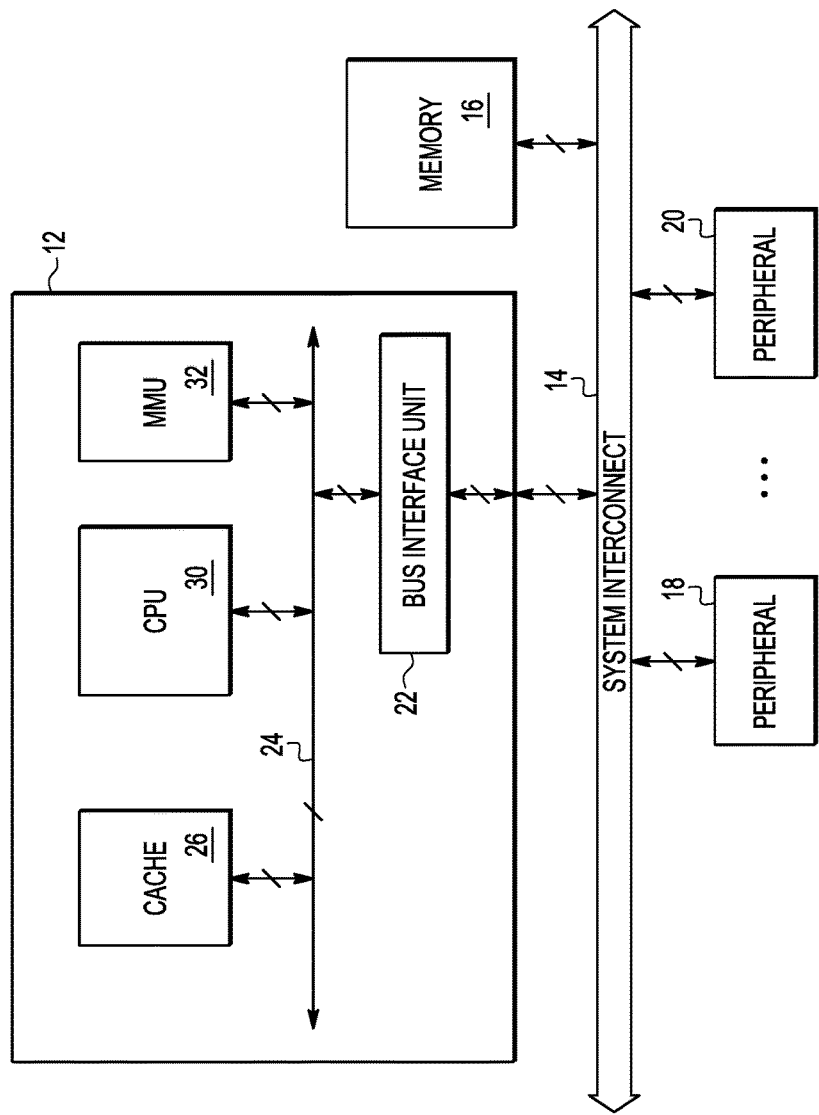
FIG. 1 illustrates, in block diagram form, a data processing system in accordance with one embodiment of the present invention.

FIG. 1 illustrates, in block diagram form, a data processing system 10. Data processing system 10 includes a processor 12, a system interconnect 14, a memory 16 and a plurality of peripherals such as a peripheral 18, a peripheral 20 and, in some embodiments, additional peripherals as indicated by the dots in FIG. 1 separating peripheral 18 from peripheral 20. Memory 16 is a system memory, also referred to as main memory, that is coupled to system interconnect 14 by a bidirectional conductor that, in one form, has multiple conductors. In the illustrated form, each of peripherals 18 and 20 is coupled to system interconnect 14 by bidirectional multiple conductors as is processor 12. Processor 12 includes a bus interface unit (BIU) 22 that is coupled to system interconnect 14 via a bidirectional bus having multiple conductors. BIU 22 is coupled to an internal interconnect 24 via bidirectional conductors. In one embodiment, internal interconnect 24 is a multiple-conductor communication bus. Coupled to internal interconnect 24 via respective bidirectional conductors is a cache 26, a central processing unit (CPU) 30, and a memory management unit (MMU) 32. CPU 30 is a processor for implementing data processing operations. Each of cache 26, CPU 30 and MMU 32 are coupled to internal interconnect 24 via a respective input/output (I/O) port or terminal.

In operation, processor 12 functions to implement a variety of data processing functions by executing a plurality of data processing instructions. Cache 26 is a temporary data store for frequently-used information that is needed by CPU 30. Information needed by CPU 30 that is not within cache 26 is stored in memory 16. MMU 32 controls accessing of information between CPU 30 and cache 26 and memory 16. In one embodiment, cache 26 is a data cache used as a temporary data store for data of memory 16. Alternate embodiments may implement cache 26 in different ways, such as an instruction cache storing instructions or a unified cache storing both instructions and data. BIU 22 provides an interface between processor 12 and system interconnect 14. BIU 22 functions to coordinate the flow of information related to instruction execution by CPU 30.

CPU 30 provides load requests (i.e. read requests) in which CPU 30 requires data stored at the corresponding access address of the load request and store requests (i.e. write request) in which CPU 30 provides store data to be written into the corresponding access address of the store request. The load and store requests are provided via interconnect 24 to MMU 32 and cache 26. In one embodiment, MMU 32, for each load and store request, performs an address translation of the access address provided with the load or store request. The access addresses are provided as virtual addresses by CPU 30, and MMU 32 translates access addresses from virtual memory addresses to physical memory addresses. As will be seen below, cache 26 operates on the physical memory addresses. MMU 32 may also divide the virtual address space (the range of addresses used by the processor) into pages, each having a size which is a power of 2. The upper address bits (higher significant bits) of the access address correspond to the virtual page number and the bottom bits (lower significant bits) of the access address provide the offset within a page.

MMU 32, along with each physical memory translation, also provides memory attributes corresponding to the access address in which the memory attributes may correspond to the page containing the access address. In one embodiment, one of the memory attributes provided is a memory coherency required attribute. Memory coherency refers to whether or not the data in the cache matches the data in main memory. If the memory coherency required attribute is asserted for the access address, then the access address is in a memory coherency region in which memory coherency between cache 26 and memory 16 is required. This may be necessary in cases where, for example, memory 16 is a shared memory. In one embodiment, the memory coherency required attribute is a single bit, which, when asserted (e.g. logic level 1) indicates that the access address is in a memory region requiring coherency (i.e. a memory coherency region) and when negated (e.g. logic level 0) indicates that the access address is not in a memory region requiring coherency. This single bit for the memory coherency required attribute is referred to herein as the M bit.

Figure 2:
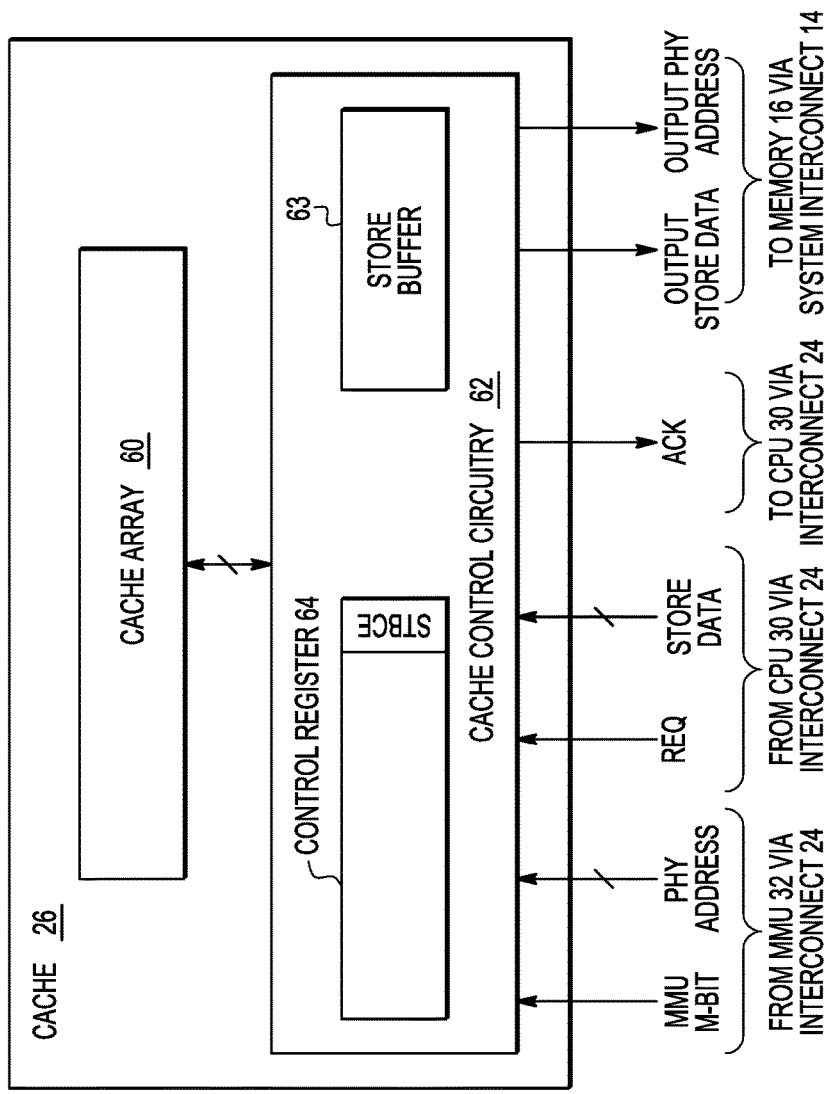
FIG. 2 illustrates in block diagram form a portion of the cache of FIG. 1 in accordance with one embodiment of the present invention.

FIG. 2 illustrates, in block diagram form, cache 26 including a cache array 60 which includes a number of cache entries, and cache control circuitry 62 coupled to cache array 60. Cache control circuitry 62 receives access requests from CPU 30 and MMU 32. Each access request includes a request indicator, REQ, a corresponding physical access address (PHY ADDRESS), a corresponding M-bit, and, in the case of a store request, STORE DATA. REQ and STORE DATA are received from CPU 30, and PHY ADDRESS and the M-bit from MMU 32. Note that REQ can correspond to either load or store requests, and STORE DATA is received in the case that REQ is a store request. Cache control circuitry 62 determines whether an access request hits or misses in cache array 60. When cache 26 provides information to CPU 30, whether in response to a cache hit or after a cache miss, cache control circuitry 62 asserts ACK which is provided to CPU 30. Cache control circuitry 62 includes a store buffer 63 having a plurality of store buffer entries. As will be discussed below, store buffer 63 provides STORE DATA and a PHY ADDRESS to memory 16 via BIU 22 and system interconnect 14. Cache control circuitry 62 also includes a control register 64 which stores a store buffer coherency enable (STBCE), which, in one embodiment, is a single bit which, when asserted (e.g. a logic level 1) indicates store buffer merging for coherency regions is enabled and when negated to a logic (e.g. a logic level 0) indicates that store buffer merging for coherency regions is disabled. In alternate embodiments, the STBCE may be more than one bit.

For store requests, in the case of a cache hit, cache control circuitry 62 stores the STORE DATA into the cache hit entry of cache array 60. Once the STORE DATA is written to cache 26, it must also, at some point, be written to memory 16 as well. Until the STORE DATA is written to memory 16, the cache entry with this STORE DATA is not coherent with memory 16. How the STORE DATA is written to memory 16 is controlled by the write policy of cache 26. Cache 26 may operate using a write-through write policy, and thus be referred to as a write-through cache or may operate using a copy-back write policy, and thus be referred to as a copy-back cache (or write-back cache).

If cache 26 is a write-through cache, upon a cache hit, a write-through cache store is performed in which a write of STORE DATA is performed synchronously to both the cache hit entry of cache array 60 and memory 16. In the current embodiment, though, cache 26 includes a store buffer, store buffer 63. Therefore, for a write-through cache store, upon a write to the cache hit entry, the STORE DATA is also written to an entry of store buffer 63 rather than directly to memory 16. At some point later, the entry of store buffer 63 will be provided, via system interconnect 14, to memory 16.

If cache 26 is a copy-back cache, upon a cache hit, a write of STORE DATA is performed initially to only the cache hit entry of cache array 60. The writing of the STORE DATA to memory 16 is postponed until later. For example, the writing to memory 16 may be performed when the cache entry containing the STORE DATA is about to be modified or replaced by new data. Also, when STORE DATA is to be written to memory 16, it is stored into an entry of store buffer 63, and at some point later, the entry of store buffer 63 will be provided via system interconnect 14, to memory 16.

For store requests, in the case of a cache miss, there are multiple approaches which may be used. In one embodiment, upon a cache miss, a write allocate is performed such that data at the access address which missed in cache 26 is loaded from memory 16 into cache 26. This write allocate is followed by a hit operation in which the store request now results in a cache hit. The STORE DATA is then processed as described above with respect to write-through or copy-back caches. In another embodiment, upon a cache miss, the STORE DATA of the store request is written directly to store buffer 63 such that it can be written directly to memory 16. In this embodiment, the STORE DATA for the missed store request is not allocated into (i.e. written into) cache array 60.

Figure 3:
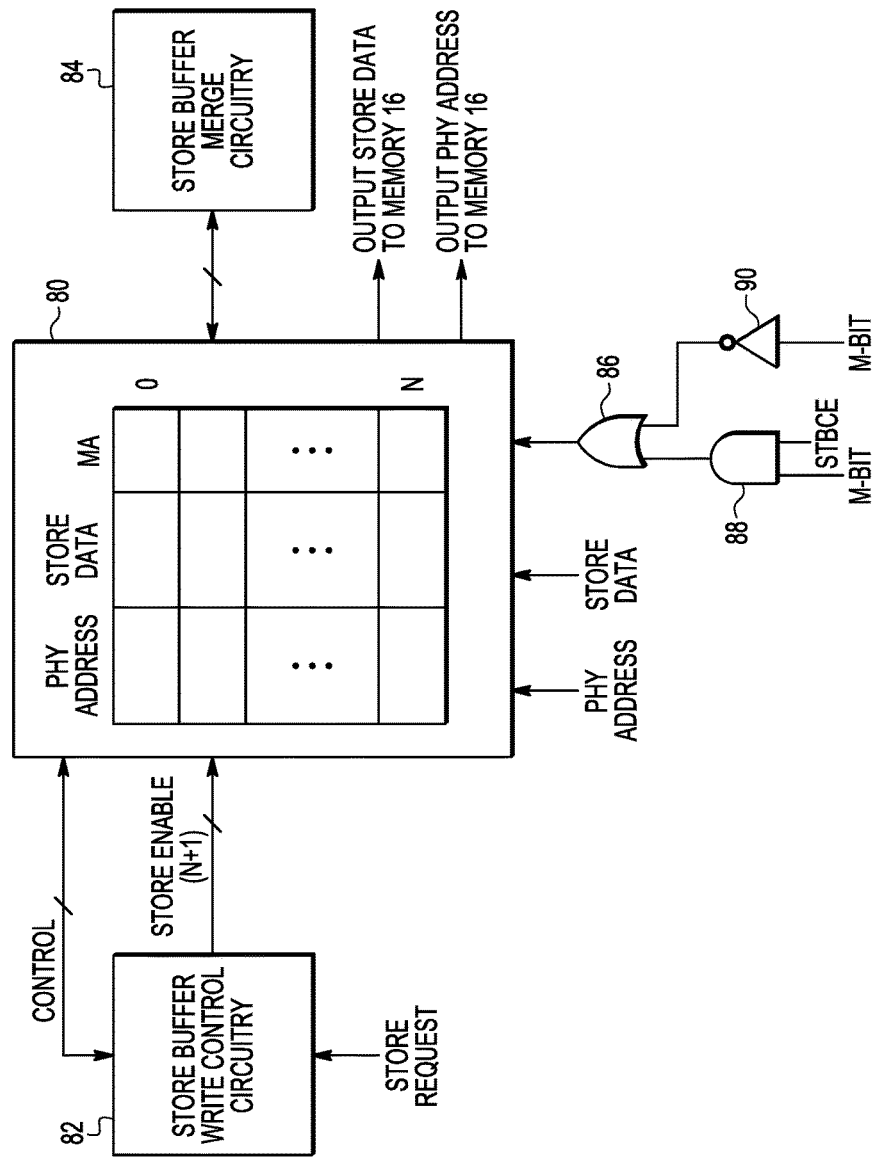
FIG. 3 illustrates, in block diagram form, the store buffer of FIG. 2 in accordance with one embodiment of the present invention.

FIG. 3 illustrates, in block diagram form, store buffer 63 of FIG. 2 in accordance with one embodiment of the present invention. Store buffer 63 includes a plurality of store buffer entries 80, which may be configured as a first-in first-out (FIFO) storage circuit. Also included as part of store buffer entries 80 is the circuitry which performs the reads and writes into the entries. Store buffer 63 also includes store buffer write control circuitry 82 which receives the store requests from cache control circuitry 62. Store buffer write control circuitry is also bidirectionally coupled to buffer entries 80, and provides store enables to buffer entries 80, in which one store enable corresponds to each entry of buffer entries 80. Store buffer 63 also includes store buffer merge circuitry 84, which is bidirectionally coupled to buffer entries 80.

In the illustrated embodiment, buffer entries 80 include N+1 entries, 0 to N. Therefore, store buffer write control circuitry provides (N+1) store enables to buffer entries 80. Since buffer entries 80 is configured as a FIFO, entries are provided from buffer entries 80 to memory 16 in the order they are stored into buffer entries 80. When there is bandwidth to send data to memory 16 via BIU 22 and system interconnect 14, buffer entries 80 provides an output STORE DATA and an output PHY ADDRESS from an oldest entry of buffer entries 80, which are provided as STORE DATA and PHY ADDRESS to memory 16 via BIU 22.

Each time STORE DATA is provided to store buffer 63 for storage, as was described above, the store request is provided to store buffer write control circuitry 82. For example, in the case that the store request resulted in a write-through cache store in cache 26 or resulted from a cache miss in cache 26, the store request is provided to store buffer write control circuitry 82 so that the STORE DATA can be stored into a selected entry of store buffer 63. Store buffer write control circuitry 82, in response to the store request, enables (i.e. asserts) an appropriate store enable signal for a selected entry in buffer entries 80 to store the corresponding STORE DATA along with its corresponding PHY ADDRESS and a corresponding Merge Allowed (MA) bit.

If an entry has its corresponding MA bit asserted, that entry is a candidate for being merged with another entry of store buffer 63. If the MA bit is not asserted for an entry, then that entry cannot be merged and thus is not a candidate for merging. The corresponding MA bit is determined based on the M-bit corresponding to the PHY ADDRESS as well as the STBCE control bit. In one embodiment, the corresponding MA bit is asserted when both the corresponding M-bit and the STBCE bits are asserted or when the corresponding M-bit is negated. That is, if the corresponding M-bit is asserted (indicating that PHY ADDRESS is in a memory coherency region), merging of the entry is only allowed if the STBE bit is asserted. If the corresponding M-bit is not asserted (indicating that PHY ADDRESS is not in a memory coherency region), merging of the entry is allowed (regardless of the value of the STBCE bit).

In one embodiment, store buffer 63 includes an OR gate 86, an AND gate 88, and an inverter 90. OR gate 86 receives an output of AND gate 88 at a first input. Inverter 90 receives the corresponding M-bit to the store request and provides the inverted value (NOT M-bit) to a second input of OR gate 86. A first input of AND gate 88 receives the corresponding M-bit corresponding to the store request and a second input of AND gate 88 receives the STBCE control bit. The output of OR gate 86 is stored as MA into the entry which is enabled by the asserted store enable signal corresponding to the store request. In this manner, when an entry in buffer entries 80 is written with STORE DATA and a corresponding PHY ADDRESS, the MA bit is asserted if both the corresponding M-bit and the STBCE bit are asserted (meaning the physical address is in a memory coherency region and that store buffer merging is allowed when the physical address is in a memory coherency region) or if the corresponding M-bit is negated (meaning the physical address is in a memory region which does not require coherency).

Figure 4:
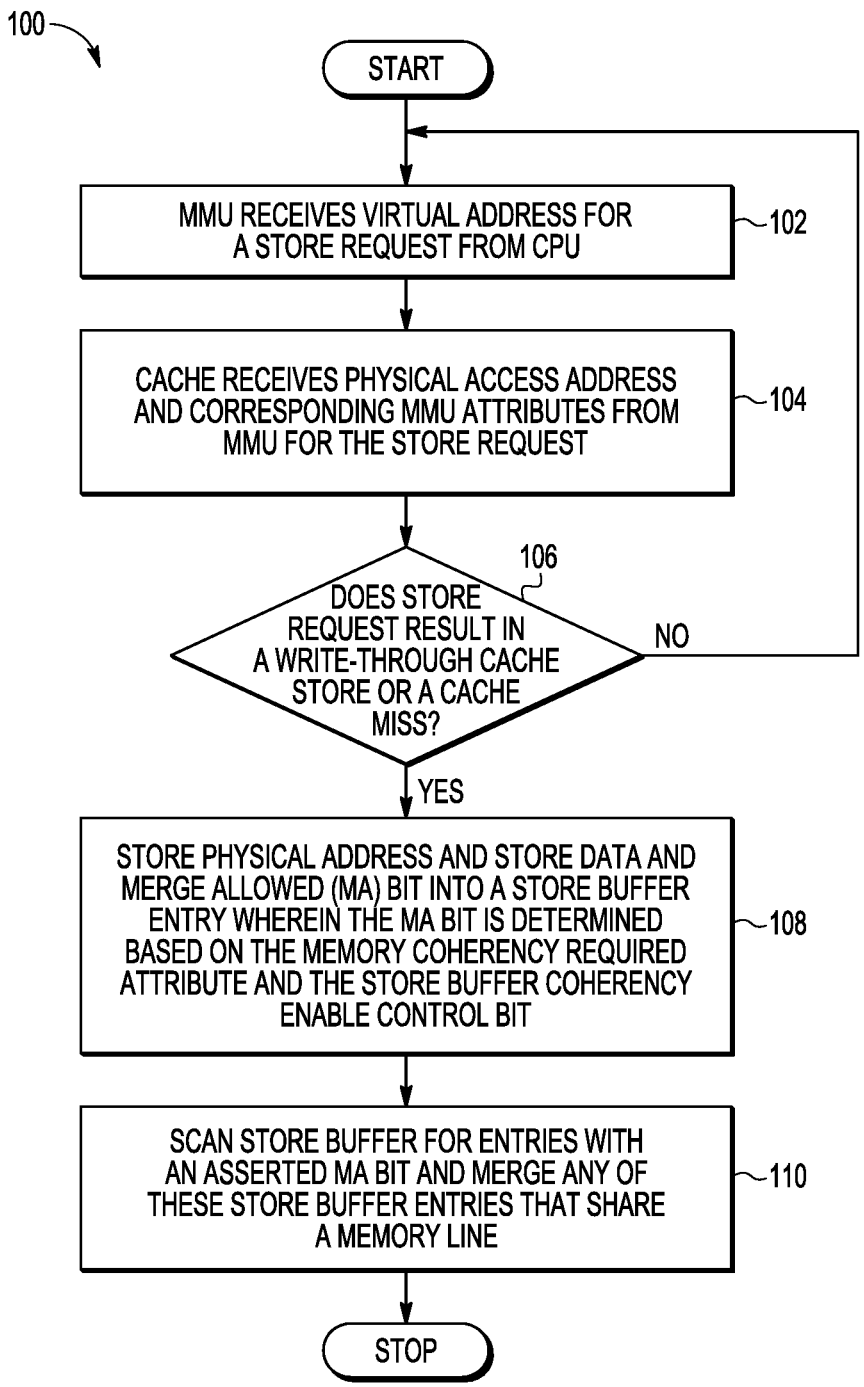
FIG. 4 illustrates, in flow diagram form, a method of operating the store buffer, in accordance with one embodiment of the present invention.

FIG. 4 illustrates, in flow diagram form, a method 100 of operation of data processing system 10. Method 100 begins with block 102 in which the MMU receives a virtual access address for a store request from the CPU. For example, CPU 30 may provide a store request (REQ) to MMU 32, and MMU 32 translates the virtual address to a physical access address as well as determines MMU attributes (i.e. memory attributes) corresponding to the physical address. Method 100 proceeds to block 104 in which the cache receives the physical access address and corresponding MMU attributes for the corresponding store request. For example, the store request may be provided by CPU 30 to cache 26 in which the corresponding PHY ADDRESS and M-bit (which is one of the MMU attributes) are received from MMU 32.

Method 100 proceeds to decision diamond 106 in which it is determined if the store request results in a write-through cache store or results in a cache miss. If not, method 100 returns to block 102 to await a next store request. If so, method 100 proceeds to block 108 in which the physical access address, store data, and merge allowed (MA) bit is stored into a store buffer entry in which the MA bit is determined based on the memory coherency required attribute (i.e. the M-bit) and the store buffer coherency enable (SBCE) control bit. For example, store buffer write control circuitry 82 enables a selected entry of buffer entries 80 to store the corresponding PHY ADDRESS, STORE DATA, and MA bit.

Method 100 then proceeds to block 110 in which the store buffer is scanned for entries with an asserted MA bit, and any of those store buffer entries that share a memory line are merged. For example, store buffer merge circuitry 84 can periodically, or after each write to an entry of buffer entries 80, perform a scan of buffer entries 80 to determine entries which have the MA bit asserted. Of those entries, any entries which share a memory line can be merged. In merging two or more entries together, a single resulting entry remains in entry 80 which is updated to include the STORE DATA of the merged entries. Therefore, when that single resulting entry is provided to memory 16, the STORE DATA of each merged entry gets written to memory 16. This allows for greater efficiency as compared to not merging the entries and providing each unmerged entry to memory 16 in separate transactions. The single resulting entry can be formed from one of the merged entries (i.e. the entries selected for merging), while the other entries of the merged entries are "emptied," meaning they are again available to be chosen by store buffer write control circuitry to write information corresponding to a new store request.

Therefore, by now it can be understood how increased efficiency can be achieved with system memory writes by indicating when entries of a store buffer can be considered as candidates for merging, based at least in part on memory coherency requirements. For example, a control bit, such as the STBCE control bit, may be asserted to indicate that store buffer merging is allowed for physical addresses which are in a memory coherency region and negated to indicate that merging is not allowed for physical addresses which are in a memory coherency region. Furthermore, by using the STBCE control bit in combination with the memory coherency required attribute (e.g. the M-bit attribute) from the MMU, improved efficiency can be achieved with selective buffer entry merging even when the memory coherency required attribute indicates that an address of the store buffer entry is located within a memory coherency region.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals. For example, rather than buses, each of internal and external interconnects 24 and 14 may be implemented as interconnect fabrics or switches.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different data processing systems. For example, although FIG. 1 and the discussion thereof describe an exemplary data processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. For example, processor 10 may have other configurations in other embodiments including multiple memories or multiple caches. Also, memory 16 can either be a volatile or non-volatile memory (e.g. Flash). Those skilled in the art will also recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, memory 16 may be located on a same integrated circuit as processor 12 or on a separate integrated circuit or located within another peripheral or slave discretely separate from other elements of data processing system 10. Peripherals 18 and 20 may also be located on separate integrated circuits or devices.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, different logic gates and functions can be used to set the MA bit of each entry of the store buffer. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

In one embodiment, a data processing system includes a memory; a central processing unit (CPU) configured to provide a store request having corresponding store data and a corresponding access address which indicates a memory location in the memory for storing the store data; a memory management unit (MMU) coupled to the CPU and configured to receive the access address of the store request and provide a memory coherency required attribute corresponding to the access address of the store request; and a cache coupled to the CPU, MMU, and memory, the cache having a cache array, store buffer, and a control register configured to store a store buffer coherency enable control bit, the cache configured to receive the store request and the memory coherency required attribute, and configured to, when the store request results in a write-through cache store or a cache miss, store the store request in a selected entry of the store buffer and store a merge allowed indicator in the selected entry of the store buffer corresponding to the store request which indicates whether or not the selected entry of the store buffer is a candidate for merging, wherein the merge allowed indicator is determined based on the memory coherency required attribute from the MMU and the store buffer coherency enable control bit of the control register. In one aspect of this embodiment, the cache is further configured to, when the store request results in a write-through cache store, also store the store request into the cache array. In another aspect, the cache is further configured to, when the store request results in a cache miss, not store the store request in the cache array in response to the cache miss. In yet another aspect, the store buffer coherency enable control bit indicates whether or not merging of an entry in the store buffer is allowed whose corresponding access address falls within a memory coherency region of the memory. In another aspect, the CPU provides the corresponding access address as a virtual address, and the MMU is configured to translate the virtual address into a physical address and provides the physical address with the memory coherency required attribute. In a further aspect, the cache receives the corresponding access address as the physical address from the MMU and uses the physical address to determine a hit or miss in the cache array. In yet a further aspect, the store buffer storing the store request into the selected entry of the store buffer comprises storing the physical address and the store data corresponding to the store request into the selected entry. In another aspect of this embodiment, the store buffer is configured as a first-in first-out (FIFO) storage circuit, and wherein the cache further comprises store buffer write control circuitry configured to select the selected entry based on FIFO operation. In another aspect, the cache further comprises store buffer merge circuitry configured to merge entries of the store buffer which include an asserted merge allowed indicator and share a memory line in the memory. In a further aspect, storing the store request into the selected entry comprises storing the access address and store data corresponding to the store request into the selected entry, wherein the store buffer merge circuitry is configured to merge entries of the store buffer by combining store data of entries being merged into a single merged entry. In another aspect of this embodiment, the store buffer coherency enable control bit, when asserted, indicates that merging of the selected entry is allowed when the corresponding access address is in a memory coherency region and, when negated, indicates that merging of the selected entry is not allowed when the corresponding access address is in a memory coherency region. In yet another aspect, an asserted merge allowed indicator for the selected entry corresponds to the memory coherency required attribute indicating that the corresponding access address is not in a memory coherency region of the memory or that both the memory coherency required attribute indicates that the corresponding access address is in a memory coherency region and the store buffer coherency enable control bit is asserted.

In another embodiment, a data processing system has a central processing unit (CPU), a memory, a memory management unit (MMU), and a cache, and a method includes providing, by the CPU, a store request having corresponding store data and a corresponding access address which indicates a memory location in the memory for storing the store data; providing, by the MMU, a memory coherency required attribute corresponding to the access address of the store request; determining whether the access address hits or misses in a cache array of the cache; when the store request results in a write-through store due to a cache hit in the cache array or results in a cache miss in the cache array, storing the corresponding access address and store data in a selected entry of the store buffer and storing a merge allowed indicator in the selected entry of the store buffer which indicates whether or not the selected entry of the store buffer is a candidate for merging, wherein the merge allowed indicator is determined based on the memory coherency required attribute from the MMU and a store buffer coherency enable control bit of the cache; and merging entries of the store buffer which include an asserted merge allowed indicator and share a memory line in the memory by combining store data of entries being merged into a single merged entry. In one aspect of this another embodiment, when the store request results in a write-through store due to a cache hit, the method further includes storing the store request into a hit entry of the cache array. In another aspect, the store buffer coherency enable control bit indicates whether or not merging of an entry in the store buffer is allowed whose corresponding access address falls within a memory coherency region of the memory. In another aspect, the CPU provides the corresponding access address as a virtual address, and the MMU translates the virtual address into a physical address and provides the physical address with the memory coherency required attribute. In a further aspect, storing the corresponding access address in the selected entry of the store buffer comprises storing the physical address in the selected entry. In another aspect of this another embodiment, the store buffer coherency enable control bit, when asserted, indicates that merging of the selected entry is allowed when the corresponding access address is in a memory coherency region and, when negated, indicates that merging of the selected entry is not allowed when the corresponding access address is in a memory coherency region. In another aspect, storing the merge allowed indicator in the selected entry of the store buffer includes storing an asserted merge allowed indicator when the memory coherency required attribute indicates that the corresponding access address is not in a memory coherency region of the memory or when both the memory coherency required attribute indicates that the corresponding access address is in a memory coherency region and the store buffer coherency enable control bit is asserted.

In yet another embodiment, a data processing system includes a memory; a central processing unit (CPU) configured to provide a store request having corresponding store data and a corresponding access address which indicates a memory location in the memory for storing the store data; a memory management unit (MMU) coupled to the CPU and configured to translate the access address of the store request into a physical address and provide the physical address and a memory coherency required attribute corresponding to the physical address of the store request; a cache coupled to the CPU, MMU, and memory, the cache having a cache array, store buffer, and a control register configured to store a store buffer coherency enable control bit, the cache configured to receive the physical address and the memory coherency required attribute from the MMU, and configured to, when the physical address results in a write-through store due to a cache hit or results in a cache miss, store the physical address and store data corresponding to the store request in a selected entry of the store buffer and store a merge allowed indicator in the selected entry of the store buffer corresponding to the store request which indicates whether or not the selected entry of the store buffer is a candidate for merging, wherein the merge allowed indicator is determined based on the memory coherency required attribute from the MMU and the store buffer coherency enable control bit of the control register; and store buffer merge circuitry configured to merge entries of the store buffer which include an asserted merge allowed indicator and share a memory line in the memory, wherein the store buffer merge circuitry is configured to merge entries of the store buffer by combining store data of entries being merged into a single merged entry.

What is claimed is:

1. A data processing system, comprising:
   a memory;
   a central processing unit (CPU) configured to provide a store request having corresponding store data and a corresponding access address which indicates a memory location in the memory for storing the store data;
   a memory management unit (MMU) coupled to the CPU and configured to receive the access address of the store request and provide a memory coherency required attribute corresponding to the access address of the store request; and
   a cache coupled to the CPU, MMU, and memory, the cache having a cache array, store buffer, and a control register configured to store a store buffer coherency enable control bit, the cache configured to receive the store request and the memory coherency required attribute, and configured to, when the store request results in a write-through cache store or a cache miss, store the store request in a selected entry of the store buffer and store a merge allowed indicator in the selected entry of the store buffer corresponding to the store request which indicates whether or not the selected entry of the store buffer is a candidate for merging, wherein the merge allowed indicator is determined based on the memory coherency required attribute from the MMU and the store buffer coherency enable control bit of the control register.

2. The data processing system of claim 1, wherein the cache is further configured to, when the store request results in a write-through cache store, also store the store request into the cache array.

3. The data processing system of claim 1, wherein the cache is further configured to, when the store request results in a cache miss, not store the store request in the cache array in response to the cache miss.

4. The data processing system of claim 1, wherein the store buffer coherency enable control bit indicates whether or not merging of an entry in the store buffer is allowed whose corresponding access address falls within a memory coherency region of the memory.

5. The data processing system of claim 1, wherein the CPU provides the corresponding access address as a virtual address, and the MMU is configured to translate the virtual address into a physical address and provides the physical address with the memory coherency required attribute.

6. The data processing system of claim 5, wherein the cache receives the corresponding access address as the physical address from the MMU and uses the physical address to determine a hit or miss in the cache array.

7. The data processing system of claim 6, wherein the store buffer storing the store request into the selected entry of the store buffer comprises storing the physical address and the store data corresponding to the store request into the selected entry.

8. The data processing system of claim 1, wherein the store buffer is configured as a first-in first-out (FIFO) storage circuit, and wherein the cache further comprises store buffer write control circuitry configured to select the selected entry based on FIFO operation.

9. The data processing system of claim 1, wherein the cache further comprises store buffer merge circuitry configured to merge entries of the store buffer which include an asserted merge allowed indicator and share a memory line in the memory.

10. The data processing system of claim 9, wherein storing the store request into the selected entry comprises storing the access address and store data corresponding to the store request into the selected entry, wherein the store buffer merge circuitry is configured to merge entries of the store buffer by combining store data of entries being merged into a single merged entry.

11. The data processing system of claim 1, wherein the store buffer coherency enable control bit, when asserted, indicates that merging of the selected entry is allowed when the corresponding access address is in a memory coherency region and, when negated, indicates that merging of the selected entry is not allowed when the corresponding access address is in a memory coherency region.

12. The data processing system of claim 1, wherein an asserted merge allowed indicator for the selected entry corresponds to the memory coherency required attribute indicating that the corresponding access address is not in a memory coherency region of the memory or that both the memory coherency required attribute indicates that the corresponding access address is in a memory coherency region and the store buffer coherency enable control bit is asserted.

13. In a data processing system having a central processing unit (CPU), a memory, a memory management unit (MMU), and a cache, a method comprising:
providing, by the CPU, a store request having corresponding store data and a corresponding access address which indicates a memory location in the memory for storing the store data;
providing, by the MMU, a memory coherency required attribute corresponding to the access address of the store request;
determining whether the access address hits or misses in a cache array of the cache;
when the store request results in a write-through store due to a cache hit in the cache array or results in a cache miss in the cache array, storing the corresponding access address and store data in a selected entry of a storage buffer and storing a merge allowed indicator in the selected entry of the store buffer which indicates whether or not the selected entry of the store buffer is a candidate for merging, wherein the merge allowed indicator is determined based on the memory coherency required attribute from the MMU and a store buffer coherency enable control bit of the cache; and
merging entries of the store buffer which include an asserted merge allowed indicator and share a memory line in the memory by combining store data of entries being merged into a single merged entry.

14. The method of claim 13, wherein when the store request results in a write-through store due to a cache hit, the method further comprises:
storing the store request into a hit entry of the cache array.

15. The method of claim 13, wherein the store buffer coherency enable control bit indicates whether or not merging of an entry in the store buffer is allowed whose corresponding access address falls within a memory coherency region of the memory.

16. The method of claim 13, wherein the CPU provides the corresponding access address as a virtual address, and the MMU translates the virtual address into a physical address and provides the physical address with the memory coherency required attribute.

17. The method of claim 16, wherein storing the corresponding access address in the selected entry of the store buffer comprises storing the physical address in the selected entry.

18. The method of claim 13, wherein the store buffer coherency enable control bit, when asserted, indicates that merging of the selected entry is allowed when the corresponding access address is in a memory coherency region and, when negated, indicates that merging of the selected entry is not allowed when the corresponding access address is in a memory coherency region.

19. The method of claim 13, wherein storing the merge allowed indicator in the selected entry of the store buffer comprises:
storing an asserted merge allowed indicator when the memory coherency required attribute indicates that the corresponding access address is not in a memory coherency region of the memory or when both the memory coherency required attribute indicates that the corresponding access address is in a memory coherency region and the store buffer coherency enable control bit is asserted.

20. A data processing system, comprising:
a memory;
a central processing unit (CPU) configured to provide a store request having corresponding store data and a corresponding access address which indicates a memory location in the memory for storing the store data;
a memory management unit (MMU) coupled to the CPU and configured to translate the access address of the store request into a physical address and provide the physical address and a memory coherency required attribute corresponding to the physical address of the store request;
a cache coupled to the CPU, MMU, and memory, the cache having a cache array, store buffer, and a control register configured to store a store buffer coherency enable control bit, the cache configured to receive the physical address and the memory coherency required attribute from the MMU, and configured to, when the physical address results in a write-through store due to a cache hit or results in a cache miss, store the physical address and store data corresponding to the store request in a selected entry of the store buffer and store a merge allowed indicator in the selected entry of the store buffer corresponding to the store request which indicates whether or not the selected entry of the store buffer is a candidate for merging, wherein the merge allowed indicator is determined based on the memory coherency required attribute from the MMU and the store buffer coherency enable control bit of the control register; and store buffer merge circuitry configured to merge entries of the store buffer which include an asserted merge allowed indicator and share a memory line in the memory, wherein the store buffer merge circuitry is configured to merge entries of the store buffer by combining store data of entries being merged into a single merged entry.

* * * * *